United States Patent [19]

Nielsen et al.

[11] Patent Number: 5,532,698
[45] Date of Patent: Jul. 2, 1996

[54] TRANSPONDER SQUAWK CALIBRATION

[75] Inventors: Brian T. K. Nielsen, Seminole; Ronald M. Miller, Sr., Clearwater, both of Fla.

[73] Assignee: Aerosonic Corporation, Clearwater, Fla.

[21] Appl. No.: 413,716

[22] Filed: Mar. 30, 1995

[51] Int. Cl.[6] .............................. G01S 13/08; G01S 7/40
[52] U.S. Cl. ............................. 342/120; 342/174; 73/386
[58] Field of Search ............................... 342/38, 46, 120, 342/121, 165, 174; 73/384, 386, 387

[56] References Cited

U.S. PATENT DOCUMENTS

| | | | |
|---|---|---|---|
| 3,595,077 | 7/1971 | Perkins | 73/384 |
| 3,618,058 | 11/1971 | Springer | 73/384 |
| 3,839,626 | 10/1974 | Klem et al. | 73/384 |
| 5,160,933 | 11/1992 | Hager | 342/174 |

*Primary Examiner*—Ian J. Lobo
*Attorney, Agent, or Firm*—Honigman Miller Schwartz and Cohn

[57] ABSTRACT

An altimeter system for aircraft employs an aneroid, dash mounted altimeter having a needle coupled to an encoder. The encoder provides a signal indicating that the needle points to a certain altitude. A solid state transducer senses outside pressure and supplies a signal to a signal processor, which instructs a transponder to transmit an ICAA coded altitude signal. When the signal from the encoder is provided to the signal processor, it compares the altitude from the needle position with the altitude that is squawked. If the error exceeds a value stored in the signal processor, a fault is indicated to the pilot and squawked. If the error is within the stored value, an offset is computed from that value and is summed with the needle altitude and the sum is squawked. The squawked altitude is the value between the altimeter reading and the altitude indicated by the transducer.

5 Claims, 2 Drawing Sheets

TRANSPONDER SQUAWK CALIBRATION

TECHNICAL FIELD

This invention relates to the transponders that are used on aircraft to transmit (squawk) the aircraft's altitude to air traffic controllers.

BACKGROUND OF THE INVENTION

Most aircraft are equipped with altitude transmitting transponders to return (squawk) an aircraft's assigned squawk code and altitude when targeted by a radar transmission from ground control radar. To provide altitude information to the transponder, the cockpit altimeter may contain a digital interface to encode the position of the analog pointer or needle as a digital signal. Using that signal, the transponder, triggered by air traffic control radar, transmits a squawk signal according to the international ICAA code. While the typical system utilizes the dashboard altimeter to provide the input to the transponder, digitizing the pointer's position adds to the size and complexity of the cockpit altimeter. One technique uses an internal n channel optical encoder to resolve pointer position into $2^n$ possible positions.

A specific ICAA altitude code is squawked when aircraft altitude is within a certain range or band. For instance, 10,000 feet would be squawked if the altitude is between 10,000 and 10,200 feet. At lower altitudes, the acceptable range (200 feet in the previous example) understandably decreases to maintain an acceptable percentage error. In the air traffic control system, air traffic control (ATC) receives the squawked signal as an altitude indication next to the echo or "blip" on a radar screen viewed by a controller tracking the aircraft. Pilots routinely report aircraft altitude, especially when changing altitude and flight levels and identifying the aircraft when entering an air traffic control center. If the two—the squawked and reported altitudes—do not agree, air traffic control notifies the pilot of the inconsistency. The squawked altitude is presumed to be wrong.

DISCLOSURE OF THE INVENTION

The objects of the present invention include providing an altimeter and transponder combination in which the squawked altitude is derived independently from altimeter but also alerts the pilot to the altitude discrepancy and then automatically squawks the altimeter reading.

According to the invention, an on board transducer detects aircraft altitude and provides an altitude signal to a signal processor, which provides a control signal to the transducer to squawk the altitude, provided the transducer's altitude meets certain standards. The signal processor is coupled to an encoder that indicates discrete altitude increments (i.e., altitude changes) derived from the cockpit altimeter pointer. If the transducer's altitude indication is within a certain range of an increment when the increment is indicated, the squawked altitude is an altitude within that range (an altitude between the indicated altitude and the transducer produced altitude). If the difference exceeds that range, an indication is provided in the cockpit that the transponder altitude is incorrect and the altimeter indication is thereafter squawked.

A feature of the present invention is that it provides an independent, solid state transponder system that automatically finds a discrepancy between squawked altitude and altimeter altitude and defaults to the altimeter when it happens. Another feature is that additional dashboard space is not required.

Other objects, benefits and features of the invention will be apparent to one of ordinary skill in the art from the following discussion.

BEST MODE FOR CARRYING OUT THE INVENTION

Figure 1:
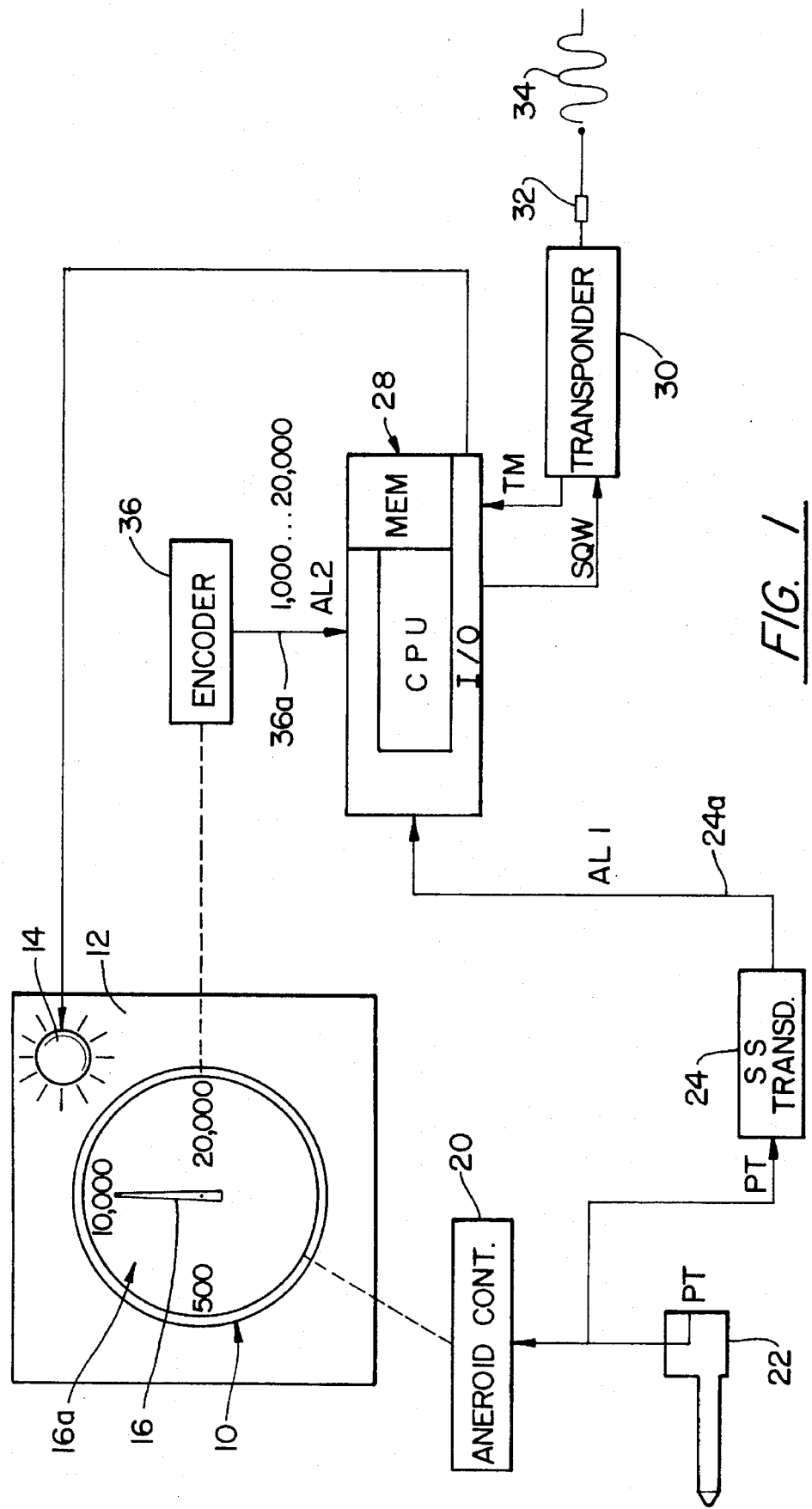
FIG. 1 is a functional block diagram of a transponder system embodying the present invention.

FIG. 1 shows an aneroid altimeter 10 mounted on an aircraft dashboard 12. A warning light 14 is also mounted on the dashboard. The altimeter includes a needle 16 that points to altitude markings (on a graduated face) ranging from 500 to 20,000 feet. The needle 16 is mechanically connected to an aneroid control (mechanism) 20 that responds to static pressure PT sensed at a pitot tube 22. The pressure PT is also applied to a solid state (SS) transducer 24 which produces an altitude signal AL1 over a line 24a to a signal processor 28 containing a central processing unit CPU, memory MEM and input-output interface I/O for receiving and outputting data and control signals such as the altitude signal AL1. The memory MEM should be assumed to contain program instructions for the CPU, among them instructions and computed values to carry out the steps shown in the flowchart in FIG. 1.

The CPU uses AL1 to produce the ICAA squawk value for AL1 as a squawk signal SQW, which is applied to a transponder 30. The transponder squawks an RF signal 34, encoded with the ICAA value and radiated from an antenna 32 in response to intercepted ground control radar signal. The squawk signal SQW is produced when a timing signal TM is applied to the signal processor 28 in response to the intercepted radar signal (not shown).

An encoder 36 is connected to the needle 16, providing a signal AL2 over the line 36a connecting the encoder to the I/O in the signal processor 28. The value of AL1 indicates the movement of the needle past discrete altitude graduations of n thousands of feet on the altimeter face 16a. For example, when the needle passes 1,000 feet, signal AL1 will indicate 1,000 feet and retain that altitude value until the needle passes 2,000, when AL1 will indicate 2,000 feet. A warning light 14 is connected, over line 12a, to the signal processor 28. The signal processor 28 produces a warning signal FL, energizing the warning light 14 when a fault in the squawk system is detected in the manner explained below.

Figure 2:
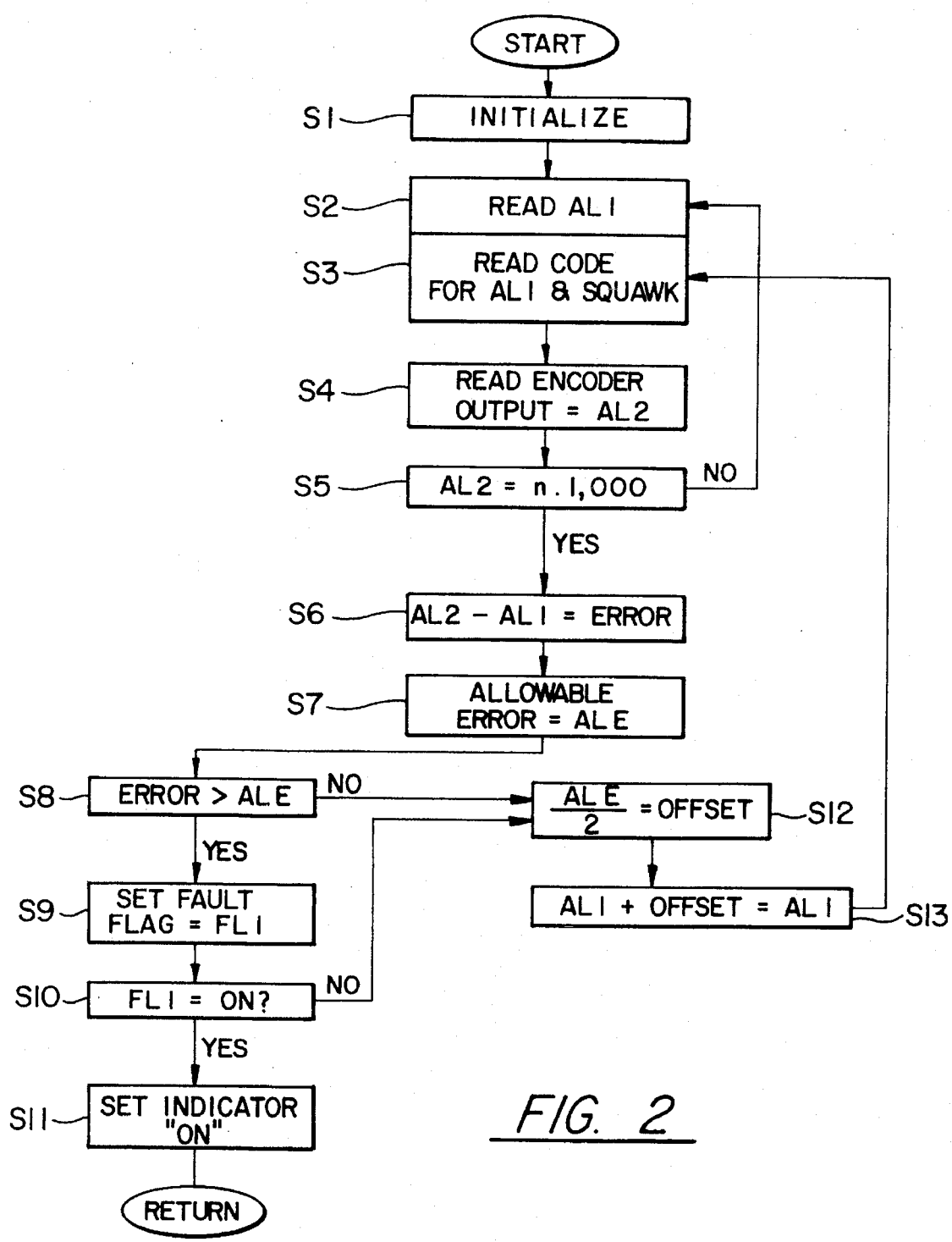
FIG. 2 is a flow chart of signal processing steps embodying the present invention.

Referring to the flow chart FIG. 2, the CPU initializes in step S1 and, after that, reads altitude AL1 at step S2. At step S3, the code for altitude AL1 is read from the stored values in MEM and the SQW signal is produced. In step S4, the value of altitude AL2 is read from the encoder 36 so that a test can be performed at step S5 to determine if AL2 is at the test altitude, such as 1,000 or 2,000 feet (n thousands). A negative answer returns the sequence to step S2. An affirmative answer leads to step S6; there the difference (ERROR) between AL1 and AL2 is determined and stored in the memory MEM. The memory MEM contains stored "allowable errors" ALE for each test altitude. These are addressed by the test altitude value AL2. For instance, if test altitude AL2 is 2,000 feet, the allowable error ALE may be +/−200 feet. Step S8 determines if ERROR is greater than ALE. An affirmative answer instructs the CPU to set a fault flag FL1 at step S9. Step S10 tests for the flag FL1 and leads to step S11, if the test in step S10 produces an affirmative result. Step S11 responds to the FL1 flage by producing an "on" signal to activate the warning light 14. Step S12 is accessed from negative answers at steps S8 and S10, both resulting from ERROR being less than ALE (in an allowable range). At step S12, an OFFSET value is produced that is a function, in this case ½, of ALE. Step S12 leads to step S13, where OFFSET is added to AL1, producing a new value for AL1, used in step S2, until step S5 produces an affirmative result.

With the benefit of the previous discussion, one of ordinary skill in the art will be able to make modifications, in whole or in part to, an embodiment of the invention described and explained above without departing from the true scope and spirit of the invention.

We claim:

1. An altimeter system comprising an aneroid altimeter having a rotating needle to point to one of a plurality of altitude graduations on a instrument card and an altitude transponder for transmitting an altitude signal, characterized by:

first means for providing a first signal indicating that the pointer is aligned with a preselected graduation;

second means for providing a pressure signal indicative of altitude; and signal processing means comprising means for receiving the pressure signal and the first signal; for storing a code for different values of said pressure signal and supplying said code to the transponder to transmit said altitude signal to indicate a first altitude; for storing an acceptable altitude variation for the first signal; for providing an error signal that represents the difference in altitude associated with the first signal and said first altitude signal; for providing a warning signal if said error signal exceeds said acceptable altitude variation; for providing said warning signal to said transponder to transmit a transponder fault signal; for determining an offset value when said error signal is less than said acceptable altitude variation; for providing a second signal to the transponder to transmit an altitude signal that represents the sum of said first altitude and said offset.

2. The altimeter system described in claim 1, further characterized by: a warning indicator visible by a pilot and activated by said warning signal.

3. The altimeter system described in claim 2, further characterized in that:

the first signal is produced each time the pointer passes through a position indicating n thousands of feet, n being an integer.

4. A system for transponding aircraft altitude, characterized by:

first means for providing a first signal indicating altitude;

second means using a pointer to indicate altitude and for providing a second signal indicating the position of said pointer and for providing, from said second signal, a third signal manifesting a selected change in pointer position from a preselected pointer position;

signal processing means for providing an error signal indicating the difference between the first signal and the second signal on the occurrence of the third signal, for providing a warning signal if said error signal exceeds an acceptable range value stored in said signal processing means for said preselected altitude, for providing an offset signal if said error signal is less than said acceptable range value, said offset signal being a percentage of a difference in altitude manifested by said error signal, and for providing a transponder signal that manifests the sum of said offset signal and said first signal;

means for providing a cockpit warning in response to said warning signal; and a transponder responsive to said transponder signal.

5. The system described in claim 4, further characterized in that: said percentage is fifty percent.

* * * * *